United States Patent [19]
Roberts et al.

[11] Patent Number: 5,352,083
[45] Date of Patent: * Oct. 4, 1994

[54] TOWING AND WRECKER TRUCK CONSTRUCTION HAVING AN EXTENSIBLE WHEEL LIFT

[76] Inventors: Don Roberts, 720 Pine St., Auburndale, Fla. 33823; Steve Gerstner, 159 Bahia Ct., Winter Haven, Fla. 33880

[ * ] Notice: The portion of the term of this patent subsequent to Oct. 5, 2010 has been disclaimed.

[21] Appl. No.: 44,213

[22] Filed: Apr. 7, 1993

Related U.S. Application Data

[63] Continuation-in-part of Ser. No. 820,495, Jan. 14, 1992, Pat. No. 5,249,909.

[51] Int. Cl.5 ............................................. B60P 1/04
[52] U.S. Cl. ................................ 414/477; 280/402; 414/563
[58] Field of Search ................ 414/563, 522, 426–430, 414/474–480, 484, 485; 280/402

[56] References Cited

U.S. PATENT DOCUMENTS

| | | | |
|---|---|---|---|
| 3,690,482 | 9/1972 | Gaumont | 414/563 |
| 3,951,280 | 4/1976 | Peck | 414/563 |
| 4,637,623 | 1/1987 | Bubik | 414/563 X |
| 4,826,385 | 5/1989 | Martinsen | 414/563 X |
| 4,904,146 | 2/1990 | Lock et al. | 414/563 |
| 4,929,142 | 5/1990 | Nespor | 414/563 |
| 4,948,327 | 8/1990 | Crupi, Jr. | 414/563 |
| 4,968,052 | 11/1990 | Alm et al. | 414/563 X |
| 5,249,909 | 10/1993 | Roberts et al. | 414/563 X |

*Primary Examiner*—David A. Bucci
*Attorney, Agent, or Firm*—Allen, Dyer, Doppelt, Franjola & Milbrath

[57] ABSTRACT

A towing truck incorporating both an elevated deck and an improved elevated wheel lift for towing and hauling vehicles is described. The elevated wheel lift comprises rotatable tire braces to aid in smooth loading and firm support of the towed vehicle's tires during towing.

2 Claims, 4 Drawing Sheets

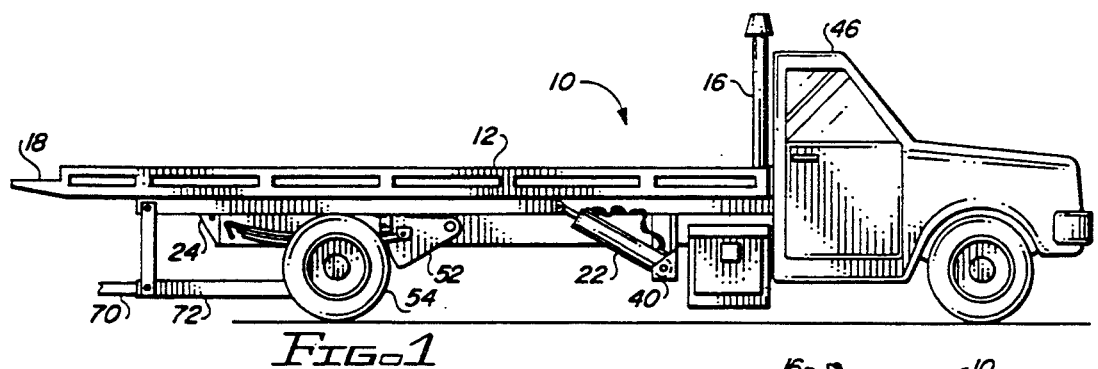
FIG.1
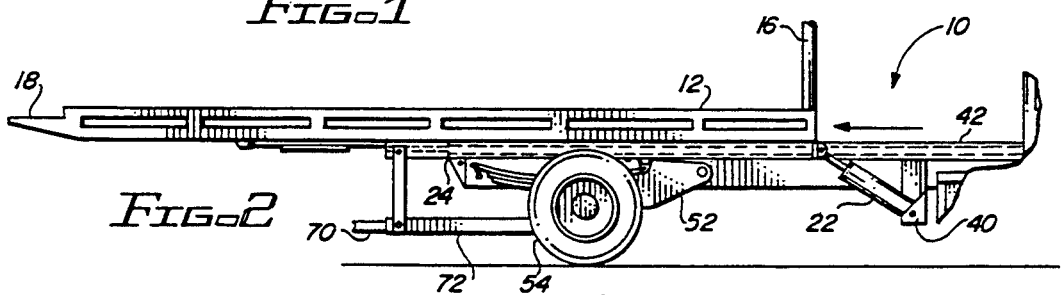
FIG.2
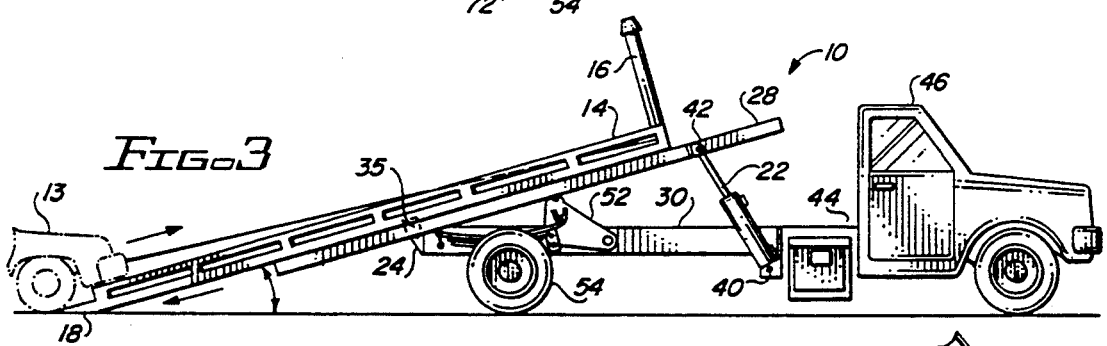
FIG.3
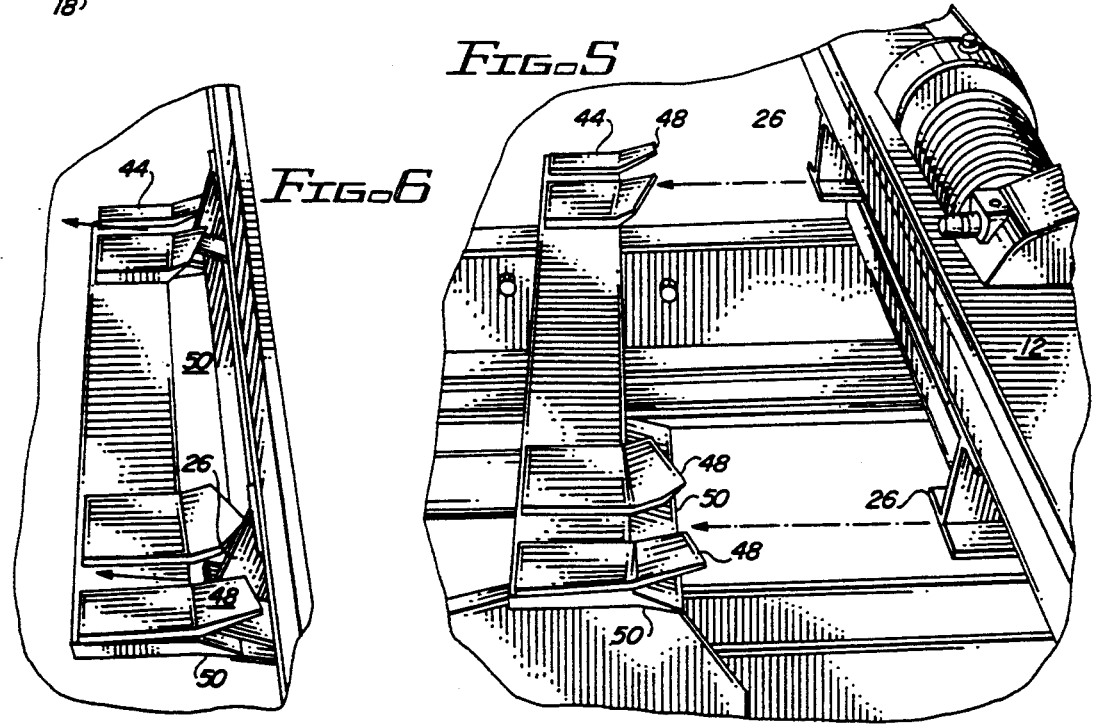
FIG.5
FIG.6

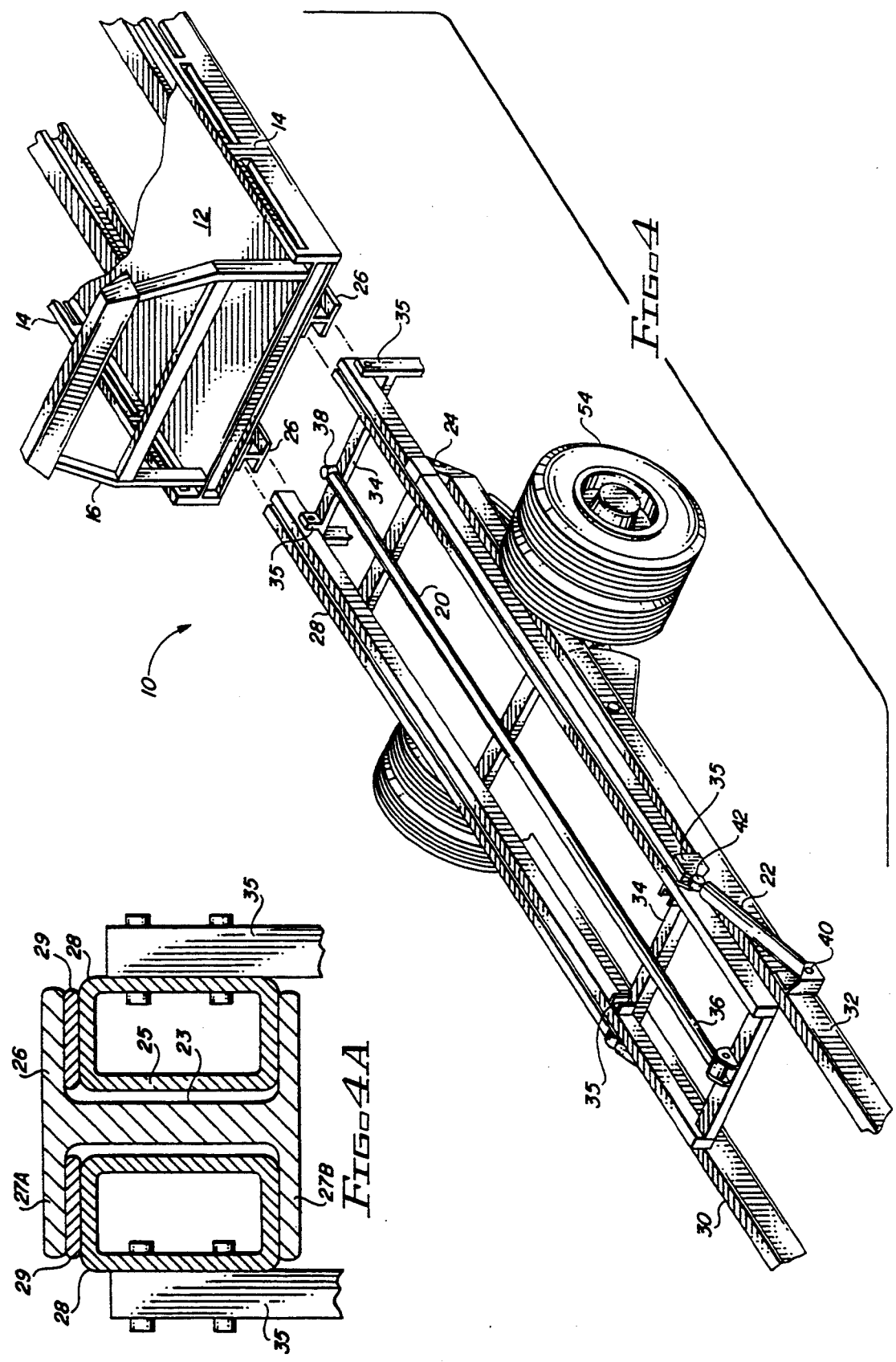

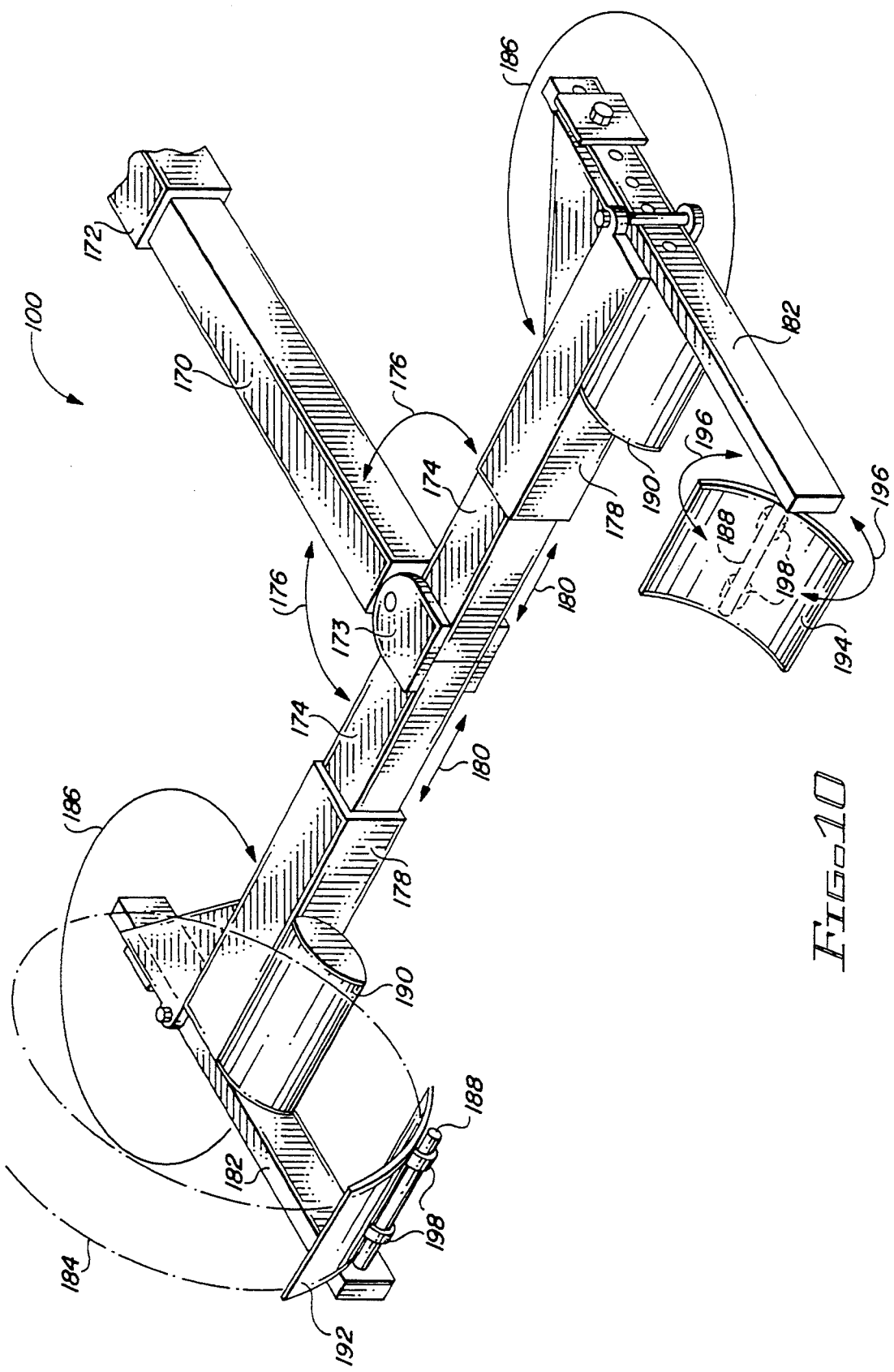

TOWING AND WRECKER TRUCK CONSTRUCTION HAVING AN EXTENSIBLE WHEEL LIFT

This application is a continuation-in-part of co-pending application Ser. No. 07/820,495 filed on Jan. 14, 1992, now U.S. Pat. No. 5,249,909.

BACKGROUND OF THE INVENTION

1. Field of the Invention

The invention pertains to towing trucks in general and, more particularly, to a towing truck that is capable of towing two (2) vehicles at the same time, if necessary.

2. General Background

There are at least three (3) methods used to tow vehicles. The first utilizes a small boom from which a cable is attached to the to-be-towed vehicle. The second incorporates a rigid stinger that lifts the to-be-towed vehicle via its wheels or bumper. The third literally pulls the to-be-towed vehicle up a ramp and onto an elevated deck. This invention pertains to the latter two methods of towing vehicles.

The advantage of the stinger method of towing vehicles is that it is relatively easy to accomplish. Preferably the front tires of the to-be-towed vehicle are lifted above the pavement before being towed away much like the boom and cable arrangement. A drawback to this method is when the to-be-towed vehicle is wrecked in such a manner that its frame is bent or both tires on the same side are damaged; then, the towed vehicle will not tow properly and instead will "fishtail" behind the tow truck, thereby creating a traffic hazard.

An advantage to the elevated deck method of towing is that no matter what shape the car is in, it can always be pulled onto the deck and transported elsewhere. A disadvantage to this method is that once the vehicle is loaded, care must be taken to prevent it from shifting laterally as this puts an undue burden on the sub-frame of the elevated deck. Also, as can be surmised, the smaller or less steep the ramp incline, the less force that is needed to pull the vehicle up the ramp and onto the deck. Further, vehicles with low ground clearance require a low-angle ramp to avoid damage in being pulled up a ramp.

It is an object of this invention to improve upon the previously disclosed towing truck that incorporates the advantages of both the elevated deck method and a modified stinger method of towing.

SUMMARY OF THE INVENTION

The preferred embodiment of the apparatus of the present invention solves the aforementioned problems in a straightforward and simple manner. What is provided is a towing truck having both an elevated deck and an extendable stinger each configured to secure a vehicle thereto. The elevated deck is pivotally supported upon a sub-frame with the deck being slidable along oppositely spaced rails. Means are provided for both tilting the deck vertically about a hinge and for horizontally extending the deck behind the back of the truck along the rails. When the deck is in the untilted, retracted position, a locking assembly secures the deck in place to prevent any possible mishap, due to accidental bed-tilting or the like, during vehicle transportation.

A preferred embodiment of an extensible wheel lift (also known as a "stinger" because of its similarity in appearance to the stinger of an insect) is also disclosed. The extensible wheel lift is provided with rotatable tire braces, upon which the vehicle to be towed is moved, the tire braces' distal edges pointing downwards and touching the ground, so that the wheels of the vehicle to be towed may move onto the extensible wheel lift smoothly. During the loading process, the weight of the vehicle to be towed causes the tire braces to rotate with the wheels, so that, when the wheels are moved to their forwardmost extent, their leading edges having been moved up against the tire stops, the rotatable tire braces are now pointing so that the distal edges are pointing upwards, the tire braces themselves conforming substantially to the shape and position of the wheels of the vehicle to be towed.

BRIEF DESCRIPTION OF DRAWINGS

For a further understanding of the nature and objects of the present invention, reference should be had to the following description taken in conjunction with the accompanying drawing in which like parts are given like reference numerals and, wherein:

FIG. 1 is a side view of the wrecker truck of the present invention, minus the stinger, with all components in the normal position;

FIG. 2 is a side view, partially cut away, of the wrecker truck of the present invention with the deck slid backward;

FIG. 3 is a side view, partially cut away of the wrecker truck of the present invention with the deck pivoted;

FIG. 4 is a top perspective view, partially broken away, illustrating the construction of the wrecker truck of the present invention;

FIG. 4A is a cross-sectional view of a portion of the apparatus shown in FIG. 4;

FIG. 5 is a pictorial view, partially broken away, illustrating the dual flange locks;

FIG. 6 is a pictorial view, partially broken away, of the dual flange locks with the I-beam engaging the locks;

FIG. 10 is a perspective view of an improved elevated wheel lift assembly in accordance with the present invention.

DETAILED DESCRIPTION OF PREFERRED EMBODIMENT

Figure 7:
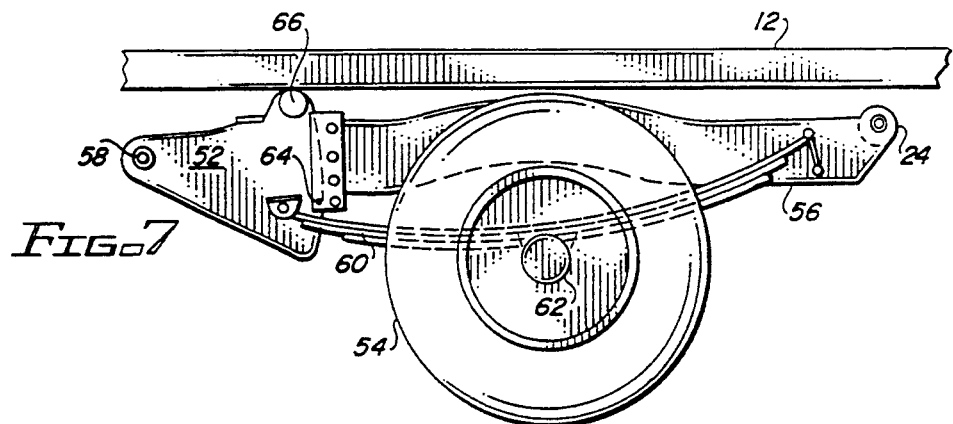
FIG. 7 is a pictorial view, partially broken away, of the spring lowering plate in the down or normal position.

Referring now to the drawing, and in particular FIGS. 1–4, the apparatus of the present invention is designated generally by the numeral 10. Apparatus 10 having elevated deck 12 used for hauling vehicles such as passenger cars or light trucks. Deck 12 incorporates side guide rails 14, a forward stop 16 and an angled end plate 18 to aid in the loading and operation of deck 12.

Normally, deck 12 is in the lowered or down position, but during the loading and unloading phases, deck 12 is slid rearward via central underdeck hydraulic cylinder 20. Additionally, the separate operation of side hydraulic cylinders 22 causes deck 12 to pivot about hinge 24 thereby creating a ramp as shown in FIG. 3. Should any final adjustments of cylinders 20 or 22 be required, such adjustments are then made.

The construction of wrecker truck 10 is better illustrated in FIG. 4, where a pair of I-beams 26 are shown fixedly secured to the underside of deck 12. These I-beams 26 not only support and brace deck 12 and prevent any sideways movement, they also enable deck 12 to slide forward and backward. This is accomplished by having each I-beam 26 slide between and along opposite pairs of spaced rails 28. As can be seen, the gap between the individual adjacent rails 28 is slightly greater than the thickness of the web of I-beam 26. Additionally, the height of the adjacent rails 28 are such that they will fit between the top and bottom flanges of I-beam 26. In this fashion, each I-beam 26 can slide between and along rails 28 as needed while also being restrained and supported by rails 28. Furthermore, by incorporating two pair of rails 28, any sideways movement of deck 12 is effectively prevented. Due to the large loads involved, it is oftentimes practical to insert a thin wear plate along the top of rails 28 to prevent any premature wear thereto.

Rails 28 themselves are secured to the underlying framework 30 of truck 10 which includes lateral and transverse members 32 and 34. As shown in FIG. 4, central underdeck hydraulic cylinder 20 is secured at end 36 to one such transverse member 34 while the other end, end 38, is connected to the underside of deck 12. Consequently, the operation of cylinder 20 (its hydraulic cylinder 22, which are illustrated in FIGS. 1-4, have one end pivotally connected to lateral member 32 of framework 30 via hinged connection 40. The opposite end of each hydraulic cylinder 20 is also pivotally connected, but this time to forward end 42 of its respective pair of rails 28. As illustrated, as side hydraulic cylinders 20 are operated (which are operated only in unison with each other, never independently), forward end 42 of rails 28 are pivoted upward (FIG. 3) about hinge 24 until the proper loading or unloading ramp angle is achieved.

As stated earlier, prior to the operation of side hydraulic cylinder 22, deck 12 has been moved rearward by central hydraulic cylinder 20. This is necessary in order to disengage deck 12 from flange locks 44, thereby permitting it to be pivoted upward. Flange locks 44, which are illustrated in FIGS. 5 and 6, are secured to framework 30 just behind cab 46. As shown, as deck 12 is moved forward, the lower flange of its dual I-beams 26 slide within each flange lock 44 where it is securely held in place. Flange locks 44 comprise upper and lower spaced plates 48 and 50 that are angled to aid in the capture of I-beams 26. Once within flange locks 44, I-beams 26, and hence deck 12, are prevented from any further sideways shifting or movement as well as being prevented from accidentally pivoting upward.

Figure 8:
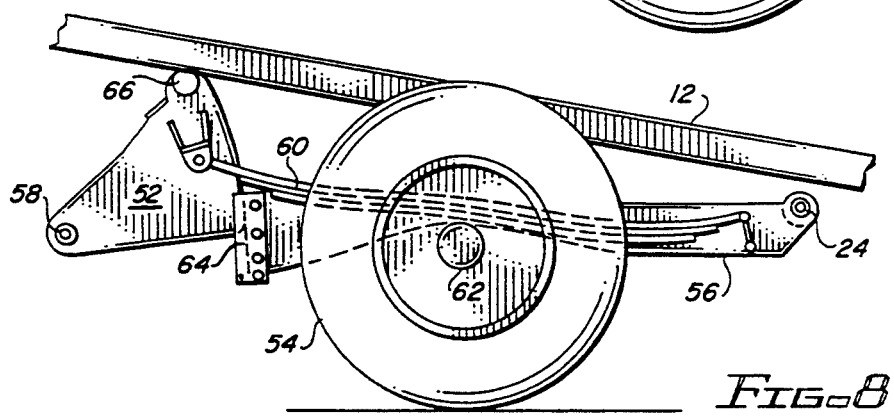
FIG. 8 is a pictorial view, partially broken away, of the spring lowering plate in the up or raised position.

Referring now to FIGS. 7 and 8, there is showing spring lowering plate 52 secured to framework 30 just in front of tires 54. As shown, one end of spring lowering plate 52 is hinged to beam 56 via pin 58 while the other end is connected to spring 60. In this fashion, beam 56 and hence framework 30 may be lowered or moved closer to axle 62 by pivoting spring lowering plate 52 upward and locking it in position via locking pin 64. Obviously, then, both roller 66 and hinge 24 act as fulcrums for deck 12. This permits a loading angle of about 7-11 degrees and an unloading angle of about 11-20 degrees.

Figure 9:
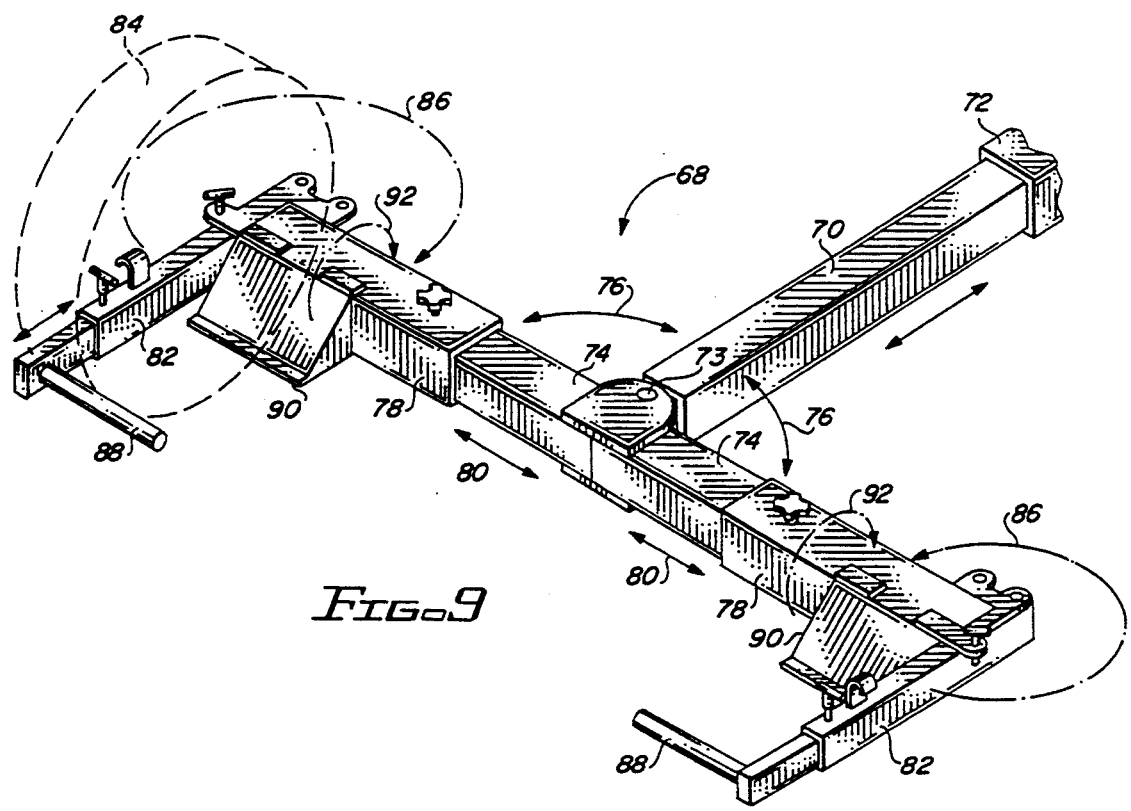
FIG. 9 is a perspective view of the stinger assembly.

Referring now to FIG. 9, there is shown stinger 68 secured to framework 30 of truck 10. As shown, the end of stinger 68 moves as support 70 retracts within/extends from guides 72. While support 70 is moved horizontally by conventional hydraulic means, guide 72 can be moved vertically by similar means to eventually raise the end of stinger 68 well above the pavement.

Support 70 is pivotally connected at pivot 73 to separate cross bars 74 which can be pivoted to rest along opposite sides of support 70 as shown by ARROWS 76. The opposite end of each cross bar 74 contains an oversized sliding member 78 which can be locked in place as needed to adjust the width of cross bar 74 (see ARROWS 80). Each end of sliding member 78 is pivotally connected to tire support 82 that engages tire 84 and prevents it from turning. ARROW 86 indicates how tire support 82 can pivot with respect to sliding members 78 with tire support 82 also being able to be locked in place as needed. Extending out the end of tire support 82 is adjustable tire brace 88 which, for storage purposes, can be removed from car support 82. Tire base 88 fits behind tire 84 and closes the gap between tire brace 88 and tire stop Tire stop 90 also engages tire 84 and between tire stop 90 and tire brace 88, tire 84 is lifted vertically upon the upward movement of guide 72. ARROW 92 illustrates how tire stop can be pivoted onto sliding member 78 so that stinger 68 can be compactly folded and stored underneath truck Obviously, all pivoting parts are lockable in place to prevent their movement during use. (Stinger 68 when folded-up can be used as a tow bar with chains to carry an auto that has been wrecked or has no wheels or suspension on one end).

FIG. 10 illustrates an improved elevated wheel lift 100 secured to framework 30 of truck 10. As shown, the end of wheel lift 100 moves as support 170 retracts/extends from guides 172. While support 170 is moved horizontally by conventional hydraulic means, guide 172 can be moved vertically by similar means to eventually raise the end of elevated wheel lift 100 well above the pavement.

Support 170 is pivotally connected at pivot 173 to separate cross bars 174, which can be pivoted to rest along opposite sides of support 170 as shown by ARROWS 176. The opposite end of each cross bar 174 contains an oversized sliding member 178 that can be locked in place as needed to adjust the width of cross bar 174 (see ARROWS 180). Each end of sliding member 178 is inserted and secured by a removable pin to tire support 182 that engages tire 184 and prevents it from turning. ARROW 186 indicates how tire support 182 can pivot with respect to sliding members 178 with tire support 182 also being able to be locked in place as needed. Extending from the end of tire support 182 is rod-shaped member 188. Rotatably affixed via rings 198 to rod-shaped member 188 is tire brace 192, shown in position to support tire 184. Tire brace 194 illustrates the position for loading a vehicle to be towed. As the vehicle to be towed is moved toward the towing vehicle, tire brace 194 rotates, shown by arrow 196, until the position shown by tire brace 192 is achieved and tire 184 is braced against tire stop 190. All pivotable parts are lockable in place to prevent their movement during use. Elevated wheel lift 100 when folded up can also be used as a tow bar with chains to carry an auto that has been wrecked or has no wheels or suspension on one end.

Because many varying and differing embodiments may be made within the scope of the inventive concept herein taught and because many modifications may be made in the embodiment herein detailed in accordance with descriptive requirement of the law, it is to be understood that the details herein are to be interpreted as illustrative and not in a limiting sense.

What is claimed is:

1. An elevated wheel lift supported by the frame of a tow truck for engaging a vehicle to be towed, wherein the elevated wheel lift comprises:

an elongated support movable into and out of the frame;

a cross bar extending lateral to and pivotably attached with the support;

two sliding end members, each telescoping with an outer end of the cross bar to permit a lateral adjustment of the cross bar;

two tire supports, each extending laterally from and pivotably attached with, a corresponding one of the sliding end members, each tire support rotatable between a storage position parallel with the cross bar and an operational position lateral to the cross bar;

two rod-shaped members, each extending laterally from and attached to a corresponding one of the tire supports; and two tire braces, each having a distal edge, each rotatably affixed along the length of a corresponding one of the rod-shaped members, rotation being possible between a position for loading a vehicle to be towed, the distal edge touching the ground, and a position for towing the vehicle, the tire brace being rotated as the vehicle to be towed is moved onto the stinger until the tire brace's distal edge is pointing away from the ground.

2. A wheeled vehicle having a sliding deck for receiving and carrying a load such as another vehicle and further having an elevated wheel lift for engaging a vehicle to be towed, the wheeled vehicle, comprising:

a frame;

two spaced pairs of rails, each pair of rails supported upon the frame and with each rail extending parallel with all of the other rails, each pair of rails defining an elongated vertical channel;

a deck having an upper support surface and a pair of spaced I-beams fixed to an underside of the deck, each I-beam having an elongated vertical web slidably fitted in the vertical channel of a corresponding rail pair, wherein each I-beam includes spaced upper and lower flanges, each rail having a vertical dimension such as to extend adjacent to and in sliding engagement with both the upper and the lower I-beam flanges; and wherein:

the elevated wheel lift is supported by the frame; and the elevated wheel lift comprises:

an elongated support movable into and out of the frame;

a cross bar extending lateral to and pivotably attached with the support;

two sliding end members, each telescoping with an outer end of the cross bar to permit a lateral adjustment of the cross bar;

two tire supports, each extending laterally from and pivotably attached with a corresponding one of the sliding end members, each tire support rotatable between a storage position parallel with the cross bar and an operational position lateral to the cross bar;

two rod-shaped members, each extending laterally from and attached to a corresponding one of the tire supports; and two tire braces, each having a distal edge, each rotatably affixed along a corresponding one of the rod-shaped members, rotation being possible between a position for loading a vehicle to be towed, the distal edge touching the ground, and a position for towing the vehicle, the tire brace being rotated as the vehicle to be towed is moved onto the stinger until the tire brace's distal edge is pointing away from the ground.

* * * * *